United States Patent
Fujiyoshi et al.

(10) Patent No.: US 10,399,428 B2
(45) Date of Patent: Sep. 3, 2019

(54) VEHICLE

(71) Applicant: TOYOTA JIDOSHA KABUSHIKI KAISHA, Toyota-shi, Aichi-ken (JP)

(72) Inventors: Tadashi Fujiyoshi, Susono (JP); Nobuki Kawamoto, Okazaki (JP); Yukio Koseki, Susono (JP); Takahiro Shiina, Numazu (JP); Hideaki Komada, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/890,902

(22) Filed: Feb. 7, 2018

(65) Prior Publication Data
US 2018/0222307 A1    Aug. 9, 2018

(30) Foreign Application Priority Data
Feb. 9, 2017  (JP) .................. 2017-021983

(51) Int. Cl.
*B60K 6/405* (2007.10)
*B60K 6/40* (2007.10)
(Continued)

(52) U.S. Cl.
CPC .............. *B60K 6/405* (2013.01); *B60K 1/04* (2013.01); *B60K 5/02* (2013.01); *B60K 6/40* (2013.01);
(Continued)

(58) Field of Classification Search
CPC . B60K 6/40; B60K 6/405; B60K 6/46; B60K 5/02; B60K 8/00; B60K 2001/0411
See application file for complete search history.

(56) References Cited

U.S. PATENT DOCUMENTS 2,915,133 A * 12/1959 Kraus .................. B60K 5/02
                                                      180/244
4,205,729 A *  6/1980 Morino ................ B60K 5/02
                                                      180/292
(Continued)

FOREIGN PATENT DOCUMENTS

CN         103358882 A       10/2013
JP         H11099834 A        4/1999
(Continued)

OTHER PUBLICATIONS

Japan Patent office, Notification of Reasons for Refusal issued in JP2017-021983 dated Apr. 14, 2017, 9 pages.
(Continued)

*Primary Examiner* — Frank B Vanaman
(74) *Attorney, Agent, or Firm* — Hunton Andrews Kurth LLP (57) ABSTRACT

A vehicle includes an engine, a generator, and a motor. The engine burns a gaseous mixture in a cylinder to output a drive force. The generator generates electricity by being rotated by the drive force outputted from the engine. The motor drives by utilizing electric power generated by the generator or electric power that has accumulated in a battery charged with electric power generated by the generator, and the motor thereby outputs a vehicle-running drive force. A case covering the motor is of larger diameter than a case covering a differential. The motor has an output shaft outputting the vehicle-running drive force, and has the output shaft disposed parallel to a vehicle width direction. The generator is disposed such that part of the generator overlaps an upper section of the case covering the differential.

8 Claims, 9 Drawing Sheets

(51) Int. Cl.
*B60K 6/46* (2007.10)
*B60K 1/04* (2019.01)
*B60K 5/02* (2006.01)
*B60K 1/00* (2006.01)

(52) U.S. Cl.
CPC .......... *B60K 6/46* (2013.01); *B60K 2001/001* (2013.01); *B60K 2001/0411* (2013.01); *B60Y 2200/92* (2013.01); *Y02T 10/6217* (2013.01)

(56) References Cited

U.S. PATENT DOCUMENTS

| 2005/0205329 | A1* | 9/2005 | Fanger-Vexler | B60G 3/145 |
| | | | | 180/234 |
| 2011/0162599 | A1* | 7/2011 | Wolverton | F02B 57/08 |
| | | | | 123/55.2 |
| 2013/0069591 | A1 | 3/2013 | Iyasu et al. | |
| 2013/0264132 | A1 | 10/2013 | Fujiwara | |
| 2015/0021114 | A1* | 1/2015 | Hotta | B60K 1/00 |
| | | | | 180/279 |
| 2016/0137052 | A1 | 5/2016 | Nakamura et al. | |
| 2016/0207386 | A1* | 7/2016 | Nagaosa | B60L 3/0015 |
| 2016/0263986 | A1* | 9/2016 | Janson | B60K 6/36 |

FOREIGN PATENT DOCUMENTS

| JP | 2005-147404 | * | 6/2005 | ............... F16H 1/36 |
| JP | 2008207570 | A | 9/2008 | |
| JP | 2009-001049 | A | 1/2009 | |
| JP | 2011143827 | A | 7/2011 | |
| JP | 2013067247 | A | 4/2013 | |
| JP | 2013082339 | A | 5/2013 | |
| JP | 2014118040 | A | 6/2014 | |
| JP | 2015020598 | A | 2/2015 | |
| JP | 2016173086 | A | 9/2016 | |
| JP | 6008051 | B2 | 10/2016 | |
| JP | 2017001542 | A | 1/2017 | |

OTHER PUBLICATIONS

Japan Patent office, Decision of Refusal issued in JP2017-021983 dated Jul. 26, 2017, 9 pages.
Japan Patent office, Decision to Grant a Patent issued in JP2017-021983 dated Oct. 19, 2017, 6 pages.

* cited by examiner

VEHICLE

CROSS REFERENCE TO RELATED APPLICATIONS

The present application claims the benefit of priority to Japanese Patent Application No. 2017-021983 filed on Feb. 9, 2017 with the Japanese Patent Office, the entire contents of which are incorporated herein by reference in its entirety.

BACKGROUND

Field of the Disclosure

The present disclosure relates to a vehicle that runs using a drive force outputted from a motor, the motor being driven using electric power generated using a drive force outputted from an engine or electric power accumulated in a battery.

Discussion of the Related Art

There is known from the past a series hybrid vehicle that drives a generating motor by an engine, stores thus generated electric power in a high energy battery, drives a drive motor by that electric power, and runs using only the drive motor as a prime mover (refer to Japanese Patent No. 6008051, for example). In the hybrid vehicle described in Japanese Patent No. 6008051, the engine and the generating motor configuring a generating unit are disposed in close proximity in a state where a crank shaft and a rotary shaft of the generating motor are coaxially coupled. Moreover, the generating unit has the crank shaft disposed in an orientation orthogonal to a front-rear direction of the vehicle. In addition, an electric motor is disposed more to a rear side of the vehicle than the generating unit and such that an output shaft of the electric motor is parallel to the rotary shaft of the generating motor.

However, in the vehicle described in Japanese Patent No. 6008051, because the rotary shaft of the generating motor and the output shaft of the electric motor are parallel to a vehicle width direction and the generating unit and the electric motor are disposed aligned in the front-rear direction of the vehicle, there is a risk that an engine room installed with the generating unit or electric motor lengthens in the front-rear direction of the vehicle and that, consequently, the vehicle ends up increasing in size in the front-rear direction.

SUMMARY

The present disclosure has been conceived noting the above-described technical problems, and an object of the present disclosure is to provide a vehicle that achieves a reduction in size in a front-rear direction.

The embodiment of the present disclosure is applied to a vehicle comprising: an engine that burns a gaseous mixture in a cylinder to generate a drive force; a generator that is rotated by the drive force to generate electricity; and a motor that is driven by electric power generated by the generator or electric power generated by the generator accumulated in a battery to generate a drive force for propelling the vehicle. In order to achieve the above-described object, at least part of a drive housing covering the motor is disposed so as to overlap below the engine or the generator.

In a non-limiting embodiment, the engine may include a horizontal engine including a cylinder bore that is formed in the cylinder, and a piston that makes reciprocating movement within the cylinder bore. In addition, the engine may be mounted on the vehicle in such a manner that a reciprocating direction of the piston within the cylinder bore intersects a vertical line at a predetermined angle.

In a non-limiting embodiment, the engine may include a crank shaft outputting the drive force, and is installed in a longitudinally-positioned posture where the crank shaft is disposed parallel to a front-rear direction of the vehicle.

In a non-limiting embodiment, the engine may include: a piston that makes reciprocating movement within a cylinder bore formed in the cylinder; and a crank shaft that outputs a drive force by the reciprocating movement of the piston. The generator may include has a rotary shaft which extends coaxially with the crank shaft, and to which the drive force is transmitted. The motor may include an output shaft that outputs the drive force to propel the vehicle. The vehicle may further comprise: an axle that transmits the drive force to drive wheels to propel the vehicle; a differential having the axle disposed coaxially with the output shaft; a first case covering the differential; and a second case covering the motor. The first case may have a diameter which is smaller than that of second case. The second case may be disposed such that at least part of the second case overlaps above the first case. The motor may be disposed on a top dead center side of the piston with respect to the differential.

In a non-limiting embodiment, the vehicle may further comprise: a cabin provided in the vehicle; a center tunnel disposed extending in the front-rear direction of the vehicle within the cabin; a speed reducer that transmits to the differential the drive force to propel the vehicle transmitted from the output shaft; and a third case covering the speed reducer while penetrating inside the center tunnel at least partially.

In a non-limiting embodiment, the output shaft of the motor may be disposed parallel to a vehicle width direction.

In a non-limiting embodiment, the vehicle may further comprise a charger that charges the battery by receiving electric power from an external power source, and the charger may be disposed above the engine.

In a non-limiting embodiment, the engine whose shape simplified so as to include an outline external shape may be a rectangular parallelepiped in a posture disposed along a long side in a width direction of the vehicle and the generator whose shape simplified so as to include an outline external shape may be a cylinder in a posture disposed along a cylindrical axis in the front-rear direction of the vehicle, may have a combined external outline which is disposed in an L-shape when viewed from an upper surface of the vehicle. The vehicle may have an inverter that converts direct current electric power outputted from the battery into alternating current electric power for the motor. The inverter may be disposed in a space of the L-shape made by the external outline of the engine and the generator.

In a non-limiting embodiment, the engine may be disposed in front of the generator in the front-rear direction of the vehicle.

As a result of the present disclosure, at least part of the drive housing covering the motor is disposed so as to overlap below the engine or the generator, hence a dimension in a vehicle front-rear direction of an engine room, for example, can be reduced, whereby a reduction in size in the front-rear direction of the vehicle can be achieved.

As a result of the disclosure in which the horizontal type engine is installed, a reduction in size in a vehicle height direction of an engine room, for example, can be achieved. In addition, a piston stroke can be made longer than a piston stroke making a reciprocating movement in a vertical direction, and, consequently, a front-rear length (a length in a crank shaft direction) of the engine can be reduced. Moreover, since it becomes possible for a gain to be made in the piston stroke, an improvement in intake speed can be achieved, hence flame propagation speed improves (combustion time shortens), combustion efficiency improves, and engine torque improves due to the improvement in combustion efficiency. Therefore, compactification of a combustion chamber can be achieved, hence surface area of the combustion chamber can be reduced, whereby thermal efficiency can be improved due to cooling loss decreasing.

As a result of the disclosure in which the engine is installed longitudinally, it is difficult for the piston to be affected by the engine swinging in the vehicle front-rear direction or by front-rear acceleration of the vehicle. Moreover, a dimension in a vehicle height direction of an engine room, for example, can be reduced.

As a result of the disclosure in which the rotary shaft of the generator is disposed coaxially with the crank shaft, at least part of the differential is disposed so as to overlap below the generator and the motor is disposed on a top dead center side of the piston with respect to the differential, hence dimensions in the vehicle front-rear direction and height direction of a unit including the engine, the generator, the motor, and the differential can be reduced.

As a result of the disclosure including a housing that covers the speed reducer, at least part of the housing has been penetrated into the center tunnel, hence a space, for example, an engine room where a unit including the engine, the generator, the motor, the differential, and the speed reducer are installed, can have its dimension in the vehicle front-rear direction reduced.

As a result of the disclosure in which the output shaft of the motor is disposed parallel to the vehicle width direction, it is possible to configure a vehicle of an FF (Front Engine Front Drive) system where, for example, a drive apparatus is installed on a vehicle front side and front wheels are configured as drive wheels. Therefore, compared to in an FR (Front Engine Rear Drive) system where the drive apparatus is installed on a vehicle rear side and rear wheels are configured as drive wheels or in a so-called mid-ship system where the drive apparatus is positioned in a vehicle body center, a drive shaft for driving the rear wheels can be omitted, hence weight reduction of the vehicle can be achieved.

As a result of the disclosure including the charger, the charger can be disposed upwardly of an engine room, for example, hence it becomes possible for a dimension in the front-rear direction of the engine room to be reduced more compared to when, for example, the charger is disposed on a vehicle front side with respect to the engine room.

As a result of the disclosure including the inverter, the inverter is disposed in the space of the L shape made by the external outline of the engine and the generator, hence the inverter can be disposed close to the generator and the motor. As a result, lengths of a harness connecting between the generator and the inverter or a harness connecting between the motor and the inverter can be shortened, and, moreover, handling of each of the harnesses becomes easy to perform. Furthermore, because the inverter is disposed upwardly of the engine, heat dissipation of the inverter can be simply performed.

As a result of the disclosure in which the engine is disposed to the front in the vehicle front-rear direction of the generator, cooling of the engine can be simply performed.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
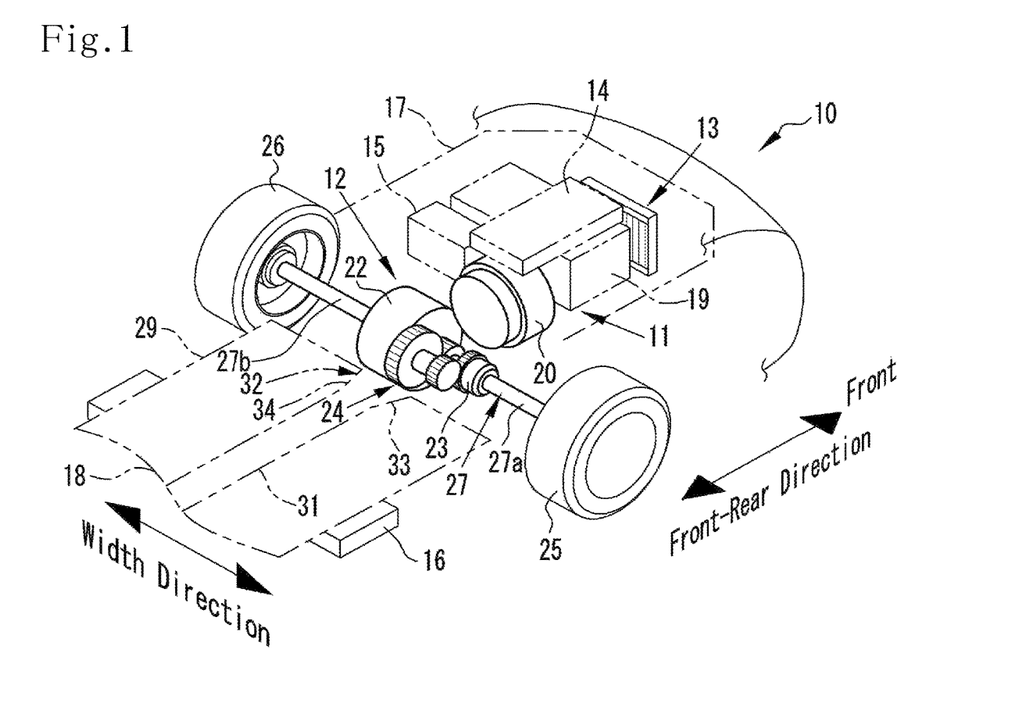
FIG. 1 is a perspective view showing an example of a vehicle employed in the present disclosure.

FIG. 1 shows an example of a vehicle 10 according to the present disclosure. As shown in FIG. 1, the vehicle 10 has the likes of a generating unit 11, a drive unit 12, a cooling unit 13, a charger 14, and an inverter unit 15 installed in an engine room 17. The engine room 17 is provided frontwards of a cabin 18 of the vehicle 10.

The generating unit 11 includes an engine 19 and a generator 20. The engine 19 outputs a drive force for rotating the generator 20. The generator 20 generates electricity by being rotated by the drive force outputted from the engine 19. The vehicle 10 includes a heat exchanger (not illustrated) that performs heat exchange between cooling water of the engine 19, the inverter unit 15, and the charger 14, and a cooling wind (air). The cooling unit 13 cools the heat exchanger.

The drive unit 12 includes a motor 22, a differential 23, and a speed reducer 24. The motor 22 is driven by at least one of electric power that has been stored in a battery 16 and electric power generated by the generator 20 thereby generating a drive force for propelling the vehicle. The speed reducer 24 amplifies a torque of the motor 22 and transmits the torque to the differential 23. The differential 23 distributes the torque delivered from the motor 22 to a front right drive wheel 25 and a front left drive wheel 26 via a right axle 27a and a left axle 27b (hereafter referred to as "axle 27").

The differential 23 may have a configuration similar to that of a conventionally known vehicular differential.

The battery 16 is in the form of a battery pack configured by a plurality of secondary unit batteries, and is disposed in other than the engine room 17, for example, below the cabin 18, in a state of being covered by a battery cover having purposes such as waterproofing and electromagnetic shield securing.

A floor panel 29 is disposed in a bottom section in the cabin 18. The floor panel 29 is provided with a center tunnel 31 extending in a front-rear direction of the vehicle 10. A front end section 32 which is on the front side of the vehicle 10, of the center tunnel 31 is connected to the engine room 17, and a rear end section of the center tunnel 31 is provided extending between seats arranged in line in a vehicle width direction within the cabin 18. The front end section 32 of the center tunnel 31 is provided with broadened opening sections 33, 34 that are broadened from an inner side toward both sides in the vehicle width direction when viewed from an upper surface of the vehicle 10.

Note that in each of the drawings described below including FIG. 1, a direction of forward advancement in the front-rear direction of the vehicle 10 is indicated as front side. Moreover, in each of the drawings described below including FIG. 1, each section is described by an outline that has been simplified so as to include an external shape (simplified outline). In other words, in order to facilitate understanding in the embodiments of the present disclosure and in order to simplify description of the drawings, actual size, scale, shape, and so on, of each section are described simplified.

Figure 2:
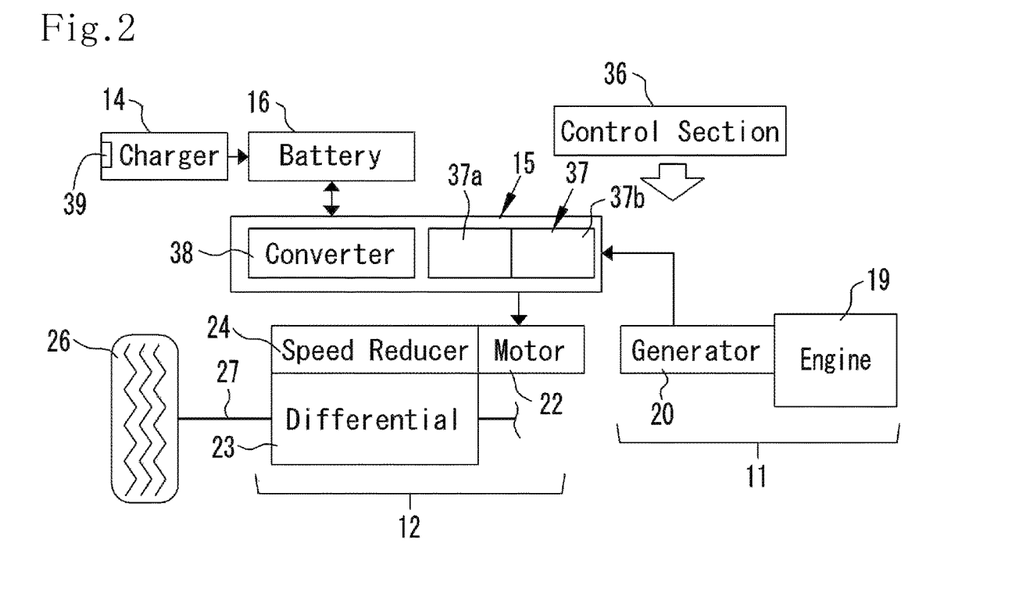
FIG. 2 is a block diagram showing an electrical configuration of the vehicle.

FIG. 2 shows an electrical configuration of the vehicle 10. As shown in FIG. 2, the vehicle 10 includes a control section 36. The control section 36 integrally controls the likes of the charger 14, the battery 16, an inverter 37 and a converter 38 that are built in to the inverter unit 15, the motor 22, the generator 20, and the engine 19. The inverter 37 has an inverter 37a which is provided for the generator 20 and an inverter 37b which is provided for the motor 22. The generator 20 and the motor 22 are three-phase alternating current rotary electric machines, for example. The control section 36 performs control making appropriate use of electric power generated by the generator 20 according to a running state of the vehicle 10 or a state of charge (to be abbreviated as "SOC" hereinafter) level of the battery 16, and so on. For example, during ordinary running, the vehicle 10 is propelled by a drive force generated by the motor 22 that is driven by electric power supplied from the battery 16 while stopping the engine 19 and the generator 20. When the SOC level of the battery 16 is lower than a predetermined level, part of the electric power generated by the generator 20 is supplied to the motor 22 via the inverter 37a and the inverter 37b. Remaining electric power generated by the generator 20 is converted from alternating current electric power to direct current electric power by the inverter 37a and the converted direct current electric power has its voltage adjusted by the converter 38 to be accumulated in the battery 16. The converter 38 is built in to the same casing as the inverter unit 15.

The charger 14 is connected to the battery 16. The charger 14 charges the battery 16 by electric power supplied via an electric power cable from an external power supply. In other words, the charger 14 converts to a direct current voltage of a certain voltage alternating current electric power from external electric power source received by a charging inlet 39, and then supplies the converted electric power to the battery 16.

Figure 3:
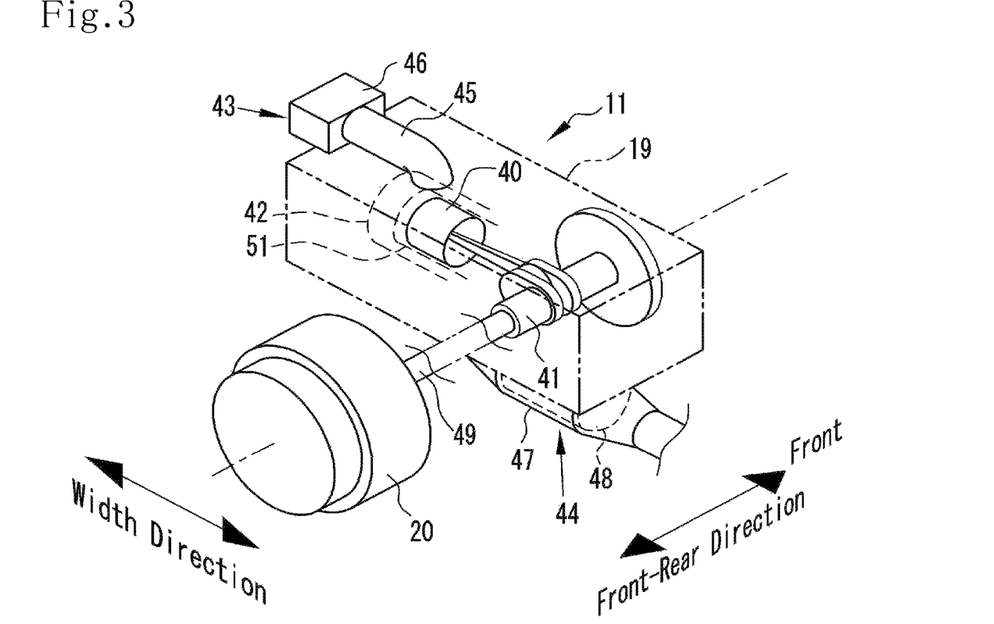
FIG. 3 is a perspective view showing an example of a generating unit.

FIG. 3 shows an example of the generating unit 11. As shown in FIG. 3, the engine 19 is a horizontal type reciprocating engine in which a direction that a piston 40 makes reciprocating movement within a cylinder bore 51 is disposed horizontally in a vehicle-mounted state. Note that "horizontal" referred to in the present disclosure includes not only completely horizontal but also, for example, a direction intersecting a vertical line at a certain angle. Moreover, the engine 19 is, for example, a single-cylinder engine, and is installed in a so-called longitudinally-positioned posture where a crank shaft 41 is parallel to the front-rear direction of the vehicle 10. Note that "parallel" referred to in the present disclosure includes not only completely parallel but also, for example, a direction intersecting a completely parallel direction at a certain angle.

An intake system 43 is provided above the engine 19, and, moreover, an exhaust system 44 is provided below the engine 19. The intake system 43 includes the likes of an intake pipe 45 and an air cleaner 46. A downstream side in an intake direction of the intake pipe 45 is connected to an intake port of a cylinder 42. The air cleaner 46 is provided on an upstream side in the intake direction of the intake pipe 45, and purifies the intake air. The exhaust system 44 includes: an exhaust pipe 47 into which exhaust gas discharged from the engine 19 flows; and an exhaust gas purifying catalyst 48 built in to the exhaust pipe 47, for example, a three-way catalyst. The engine 19 burns a gaseous mixture in the cylinder 42 to generate a drive force.

The generator 20 has a rotary shaft 49 coaxial with the crank shaft 41 and is disposed close to the engine 19 to the rear in the front-rear direction of the vehicle 10 of the engine 19. Note that the generator 20 may be disposed separated from the engine 19.

Figure 4:
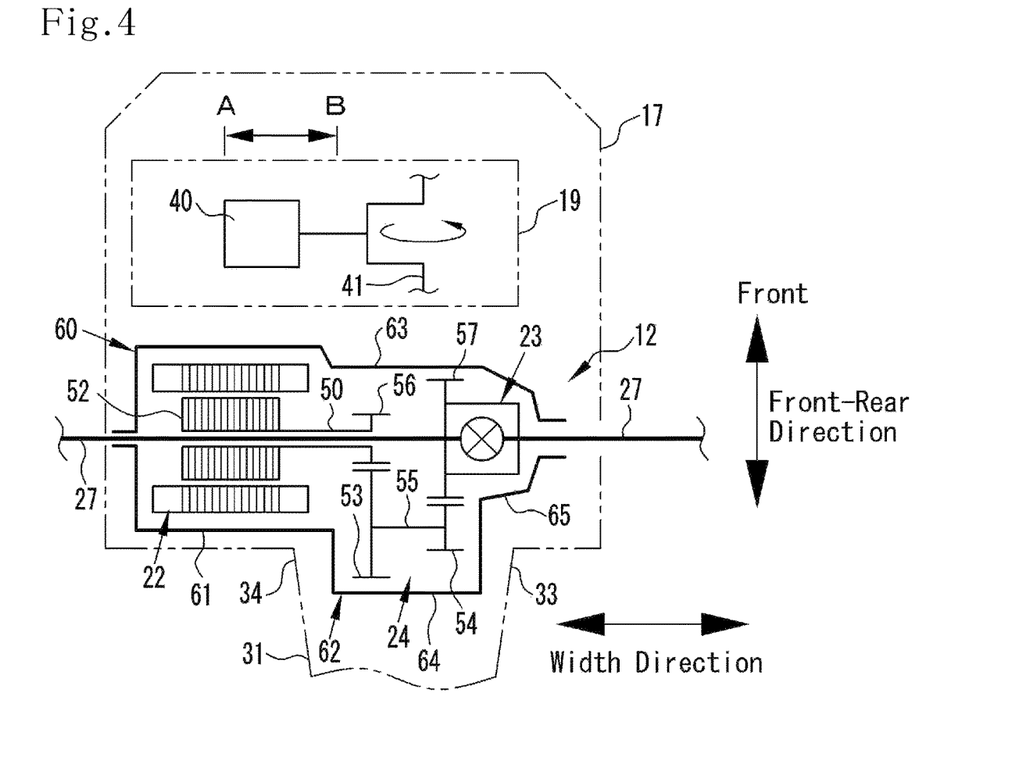
FIG. 4 is an explanatory view showing schematically a drive unit.

FIG. 4 shows schematically the drive unit 12. As shown in FIG. 4, the drive unit 12 includes the motor 22, the speed reducer 24, and the differential 23. An output shaft (or a rotor shaft) 50 of the motor 22 is disposed parallel to the axle 27 and in a direction orthogonal to the crank shaft 41. The differential 23 is disposed such that the axle 27 is coaxial with the output shaft 50. In other words, the motor 22 has a structure where the axle 27 is penetrated inside a rotor 52. The output shaft 50 of the motor 22 is disposed parallel to the vehicle width direction.

The speed reducer 24 amplifies the drive force generated by the motor 22 and transmits the amplified drive force to the differential 23, and has a first gear 53, a second gear 54, and a counter shaft 55. The counter shaft 55 integrally couples the first gear 53 and the second gear 54. The first gear 53 is diametrically larger than the second gear 54, and meshes with a reduction gear 56 formed on the output shaft 50. The second gear 54 meshes with a differential ring gear 57 of the differential 23. The motor 22 is disposed in a direction of a top dead center A of the piston 40 with respect to the differential 23. Note that a symbol B shown in the same drawing indicates a bottom dead center. The counter shaft 55 is disposed parallel to the output shaft 50 or the axle 27, in a position displaced in a radial direction of the reduction gear 56 with respect to the output shaft 50. Note that in FIG. 4, in order to explain the top dead center A of the piston 40, a position of the engine 19 with respect to the drive unit 12 is described shifted to a position different from reality, in other words, frontwards in the front-rear direction of the vehicle 10.

Such a drive unit 12 is covered by a drive housing 60 that houses the motor 22, the speed reducer 24, and the differential 23. The drive housing 60 has a first section 61 covering the motor 22, and the first section 61 is shaped into a cylindrical shape that is diametrically larger than an external outline of a generating cover 66 (refer to FIG. 5) of the generator 20. The drive housing 60 includes a second section 62 in a position shifted in the vehicle width direction from the first section 61. The second section 62 has a shape combining those of a main body section 63 covering the reduction gear 56 and a projecting section 64 covering the speed reducer 24. The main body section 63 has an outer periphery centered on the axle 27 and is shape into a cylindrical shape that is diametrically smaller than the first section 61. Moreover, the projecting section 64 is configured substantially in a shape of a semicircular body projecting toward the rear side and upper side of the vehicle 10 with respect to the main body section 63. The drive housing 60 includes a third section 65 on an opposite side to the first section 61 with respect to the second section 62 in the vehicle width direction. The third section 65 covers the differential 23 and its outer periphery centered on the axle 27 is diametrically smaller than the first section 61 and the main body section 63. In other words, the drive housing 60 has an outline shape whose diameter gradually narrows (narrows in stages) with sequential progression from the first section 61 to the main body section 63 to the third section 65. Note that the drive housing 60 may be configured divided into the first section 61, the second section 62, and the third section 65, for example. Moreover, a planetary gear set, for example, may be adopted as the speed reducer 24. In this case, the planetary gear set may be disposed coaxially with the output shaft 50 between the output shaft 50 and the differential 23. The third section 65 serves as a first case in the embodiment of the present disclosure. The generating cover 66 serves as a second case in the embodiment of the present disclosure.

Figure 5:
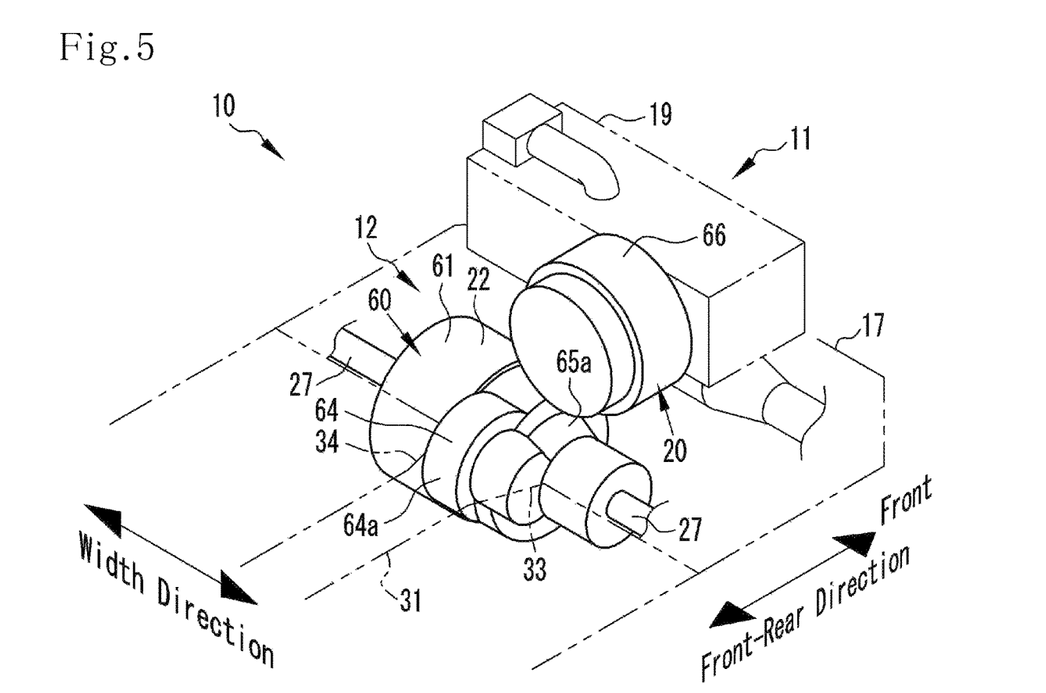
FIG. 5 is a perspective view showing the generating unit and the drive unit.

FIG. 5 is a perspective view showing the generating unit 11 and the drive unit 12. As shown in FIG. 5, at least part of the projecting section 64 of the drive housing 60, for example, a rear section 64*a* projecting most to the rear side of the vehicle 10, of the projecting section 64 of the drive housing 60 penetrates into the broadened opening sections 33, 34. In other words, at least the rear section 64*a* of the drive unit 12 is disposed so as to be contained within the center tunnel 31. As a result, the drive unit 12 can be disposed displaced to the rear side of the vehicle 10 on the inside of the engine room 17, hence size reduction in the front-rear direction of the vehicle 10, of the engine room 17 can be achieved. Note that the projecting section 64 serves as a third case in the embodiment of the present disclosure.

Figure 6:
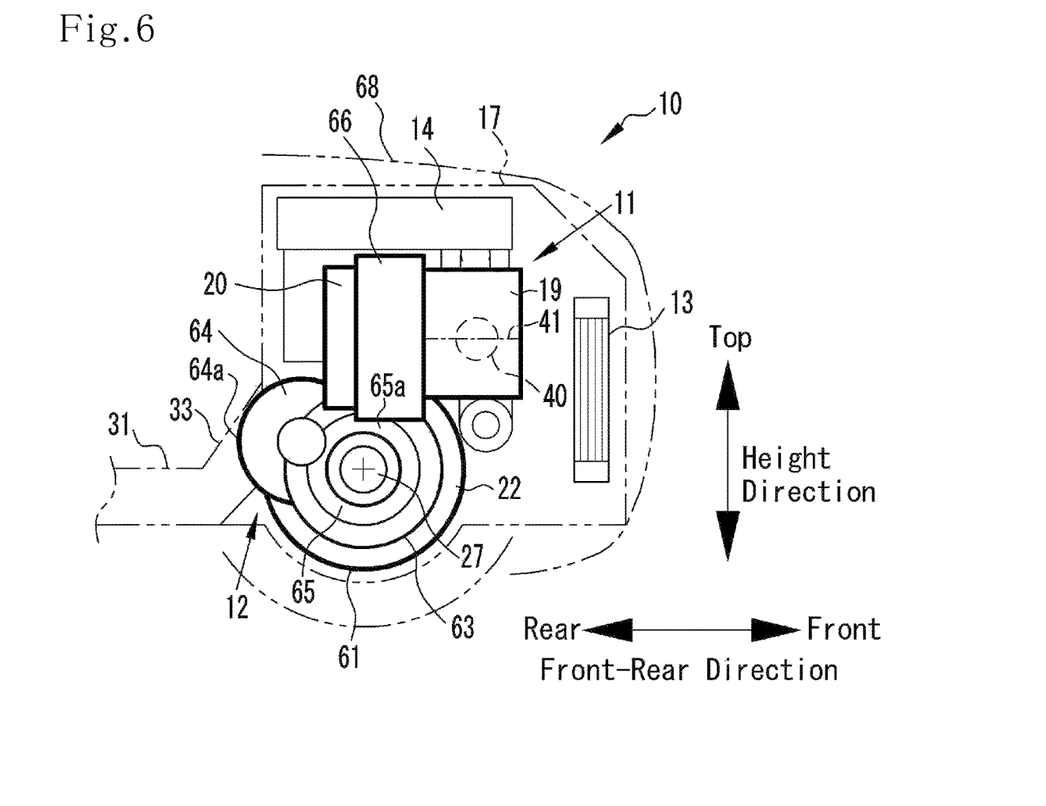
FIG. 6 is a side view showing the generating unit and the drive unit.

FIG. 6 is a side view showing the generating unit 11 and the drive unit 12. As shown in FIG. 6, in the drive unit 12, the first section 61 covering the motor 22 is diametrically larger than the third section 65 covering the differential 23. At least part of the third section 65 of the drive unit 12, for example, an upper section 65*a* in a height direction of the vehicle 10, of the third section 65 of the drive unit 12 is disposed so as to overlap below the generating cover 66. In other words, in the height direction of the vehicle 10, part of the generator 20 is disposed overlapping the motor 22. Therefore, the drive unit 12 can be disposed displaced to the lower side of the vehicle 10 inside the engine room 17, hence size reduction in the height direction of the vehicle 10, of the engine room 17 can be achieved. Moreover, since the diameter of the third section 65 is smaller than that of the first section 61, the engine 19 can be placed in a low position on the inside of the engine room 17.

Figure 7:
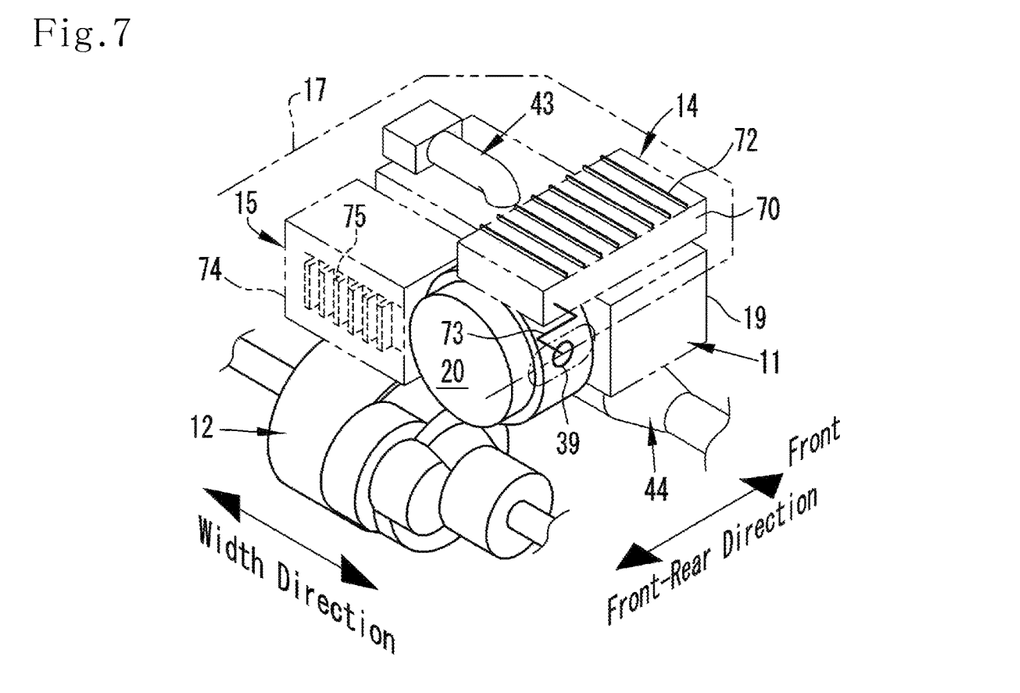
FIG. 7 is a perspective view showing a charger and an inverter unit.

FIG. 7 shows the charger 14 and the inverter unit 15. As shown in FIG. 7, the engine room 17 has a horizontal type engine 19 disposed therein, hence a space is vacant between the engine 19 and a bonnet 68 (refer to FIG. 6). In the present embodiment, the charger 14 is disposed in the space between the engine 19 and the bonnet 68. The charger 14 includes a charger cover 70 configured as, for example, a rectangular parallelepiped whose thickness in the height direction of the vehicle 10 is thin. The charger cover 70 has a box shape extending in the front-rear direction of the vehicle 10 and is disposed so as to cover above the generator 20 from a position above the engine 19 excluding the intake system 43.

A plurality of heat dissipation plates 72 are provided on an upper surface of the charger cover 70. The charger 14 generates heat during charging, and waste heat generated from the charger 14 is conducted to the heat dissipation plates 72 via the upper surface of the charger cover 70 and thereby dissipated. Because the charger 14 is disposed upwardly on the inside of the engine room 17, a heat dissipation effect of the heat dissipation plates 72 improves. Moreover, the engine room 17 can be warmed by the waste heat. Note that a configuration may be adopted whereby the waste heat is utilized to warm a purifying catalyst. In this case, for example, the exhaust system 44 may be disposed in a periphery of the charger 14, for example, above the engine 19.

The charging inlet 39 is provided on a side surface of the engine room 17. A charging cable (not illustrated) for connecting to the external power supply is connected to the charging inlet 39. The charger 14 is connected to the charging inlet 39 via an alternating current power feed line 73. In the present embodiment, since the charger 14 has been disposed upwardly in the engine room 17, wiring can be performed by a short alternating current power feed line 73 and, moreover, it becomes easy for handling of wiring to be performed.

Figure 8:
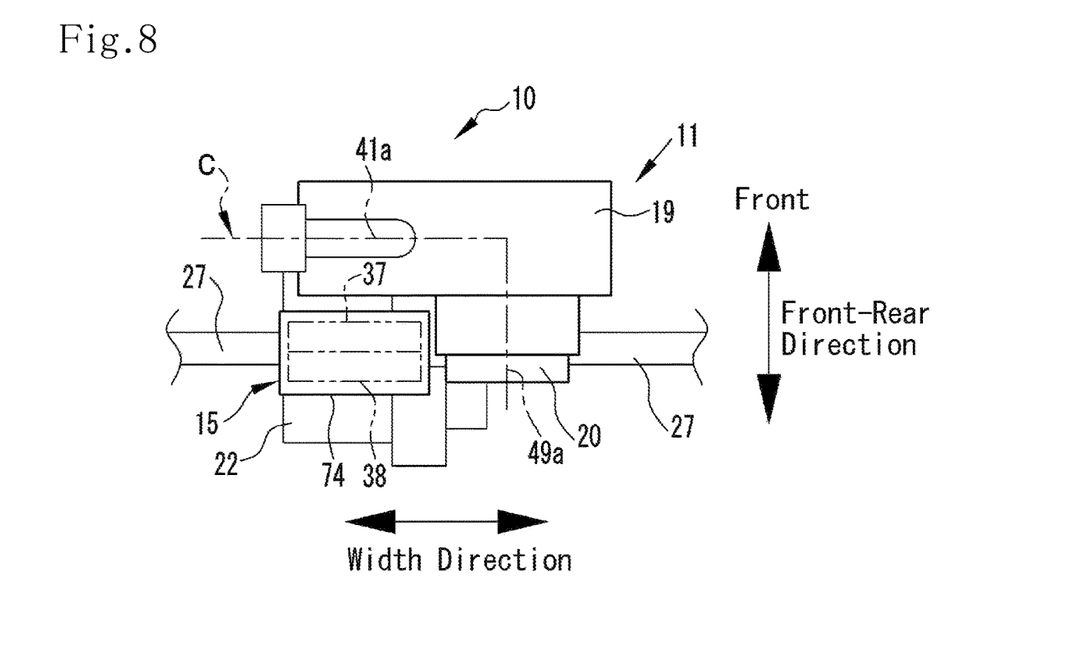
FIG. 8 is a plan view showing the generating unit and the inverter unit.

FIG. 8 shows the generating unit 11 and the inverter unit 15. As shown in FIG. 8, the inverter unit 15 includes an inverter cover 74 configured as, for example, a rectangular parallelepiped, having purposes such as waterproofing and electromagnetic shield securing. Moreover, the inverter unit 15 includes internally the likes of heat dissipation plates 75 (refer to FIG. 7) for cooling the inverter 37 or the converter 38. Therefore, size of the inverter unit 15 increases. In other words, the inverter unit 15 has an external outline of a rectangular parallelepiped whose thickness is bulkier than that of the charger 14.

An outline simplified so as to include an external shape, of the engine 19 is a rectangular parallelepiped long in the vehicle width direction, when viewed from the upper surface of the vehicle 10. An external outline of the generator 20 is a cylindrical body whose cylindrical axis has been aligned along the front-rear direction of the vehicle 10. In other words, as a result, the engine 19 and the generator 20 have, for example, an external outline lying along a one dot-chain line C that joins a shaft center 41*a* of the crank shaft 41 and a shaft center 49*a* of the rotary shaft 49 to form an L shape, when viewed from above the vehicle 10. Moreover, the engine 19 is disposed more to a front side of the vehicle 10 than the generator 20 is. Therefore, the inverter unit 15 is disposed on an inner side of the L shape formed by the outline external shape of the engine 19 and the generator 20, in a posture that a longitudinal direction of the inverter unit 15 has been aligned along the vehicle width direction. The inverter cover 74 has connected thereto the likes of a harness connecting the inverter unit 15 and the battery 16, a harness connecting the inverter unit 15 and the engine 19, and a harness connecting the inverter unit 15 and the generator 20 (none of which are illustrated). The inverter unit 15 is disposed close to the generator 20 and the motor 22.

Therefore, in the present embodiment, short harnesses can be used and, moreover, it becomes easy for handling of wiring to be performed.

Note that in FIG. 8, the generator 20 is disposed displaced to a right side in the vehicle width direction with respect to the engine 19 to configure the L shape, when viewed from the upper surface of the vehicle 10. However, the generator 20 may be disposed displaced to a left side in the vehicle width direction with respect to the engine 19 to configure the L shape, when viewed from the upper surface of the vehicle 10.

Figure 9:
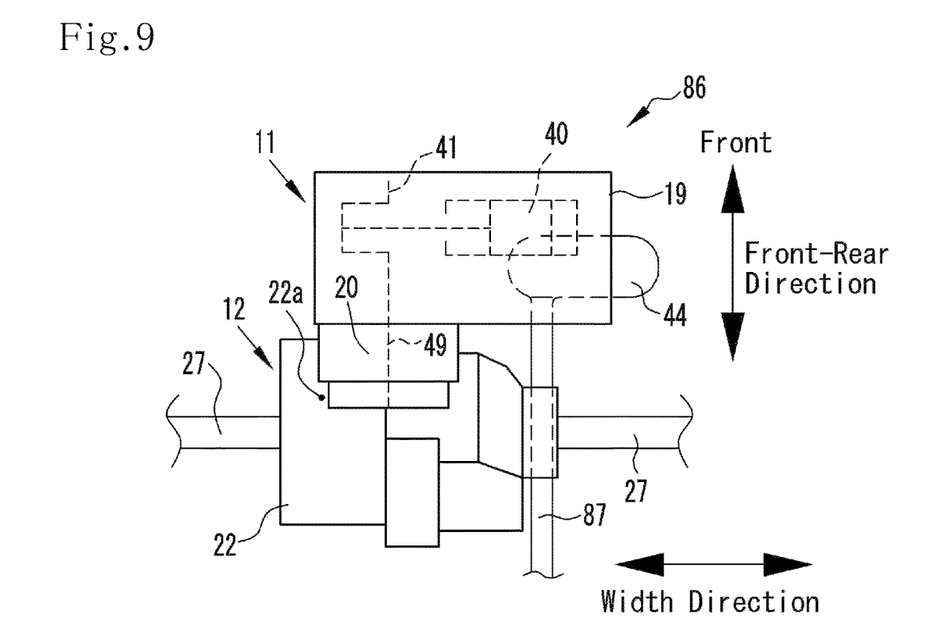
FIG. 9 is a plan view showing an embodiment where a generator is displaced to a left side in a vehicle width direction with respect to the engine.

FIG. 9 shows an embodiment where the generator 20 has been disposed displaced to the left side in the vehicle width direction with respect to the engine 19. As shown in FIG. 9, an outline simplified so as to include an external shape, of the engine 19 is a long rectangular parallelepiped in a posture that its long side has been aligned along the vehicle width direction when viewed from above the vehicle 10. The generator 20 is disposed displaced to the left side in the vehicle width direction with respect to the engine 19. The generator 20 is disposed with the rotary shaft 49 coaxial with the crank shaft 41 and is disposed close to the engine 19 to the rear in the front-rear direction of the vehicle 10 of the engine 19. In the present embodiment, at least part of the motor 22, for example, substantially an upper section 22a located to an upper side and a front side of an outer periphery centered on the axle 27, of the motor 22 is disposed so as to overlap below the generator 20. Moreover, in the present embodiment, a space is generated below the engine 19 and to the right side in the vehicle width direction of the drive unit 12. Therefore, an exhaust pipe 87 of the exhaust system 44 can be disposed toward the rear side of the vehicle 10 utilizing the space generated to the right side. Note that in FIG. 9, members that are the same as or similar to members described in FIGS. 1 to 8 are assigned with the same symbols as those assigned in FIGS. 1 to 8, and detailed descriptions thereof are omitted here.

Moreover, in the embodiment described in FIG. 9, the engine 19 is disposed to the front in the front-rear direction of the vehicle 10 of the generator 20, when viewed from the upper surface of the vehicle 10. However, the present disclosure is not limited to this, and the engine 19 may be disposed more to the rear than the generator 20.

The above-described embodiments are each exemplifications of the present disclosure and are not limited to the above-described embodiments. The above-described embodiments may each be appropriately changed in a range not departing from the object of the present disclosure.

For example, in each of the above-described embodiments, the engine room 17 is disposed frontwards of the cabin 18. However, the engine room 17 may be disposed rearwards of the cabin 18. In this case, rear wheels of the vehicle 10 become drive wheels.

Moreover, in each of the above-described embodiments, the engine is described as the single cylinder engine 19. However, the present disclosure is not limited to this, and the engine may have multiple cylinders.

Figure 10:
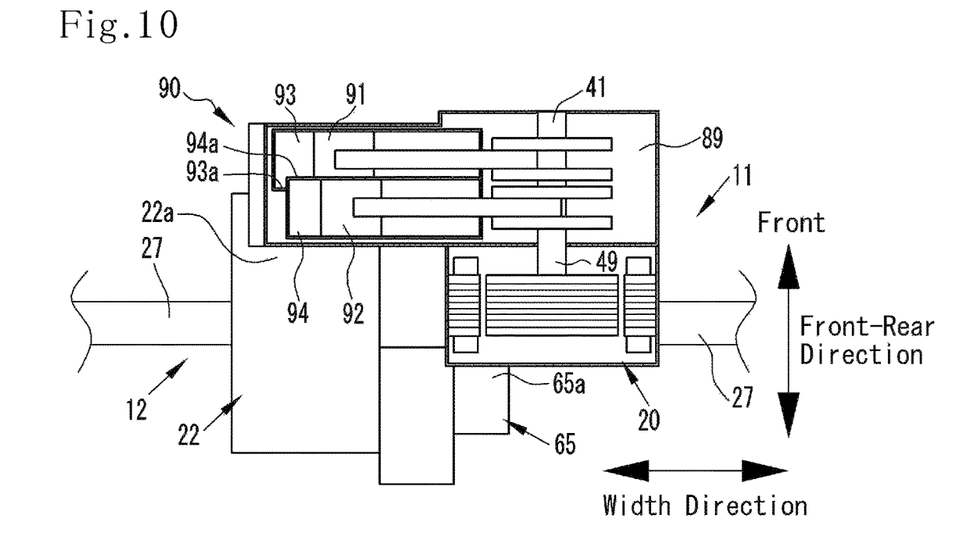
FIG. 10 is a plan view showing an embodiment where an engine having multiple cylinders is used.

FIG. 10 is a plan view showing an embodiment where an engine 89 having multiple cylinders is used. As shown in FIG. 10, the engine 89 is a two cylinder reciprocating engine having a first piston 91 and a second piston 92. The first piston 91 and the second piston 92 are disposed aligned in the front-rear direction of the vehicle 10. The engine 89 in a vehicle-mounted state has: a first cylinder 93 in which the first piston 91 makes reciprocating movement; and a second cylinder 94 in which the second piston 92 makes reciprocating movement. The first cylinder 93 and the second cylinder 94 are disposed leftwards in the vehicle width direction sandwiching the crank shaft 41. The engine 89 is installed in a longitudinally-positioned posture. At least part of the motor 22, for example, substantially the upper section 22a of the motor 22 is disposed so as to overlap below the engine 89, for example, below a block 95 where the first cylinder 93 and the second cylinder 94 are built in, of the engine 89. In addition, at least part of the third section 65, for example, the upper section 65a of the third section 65 is disposed so as to overlap below the generator 20.

Figure 11:
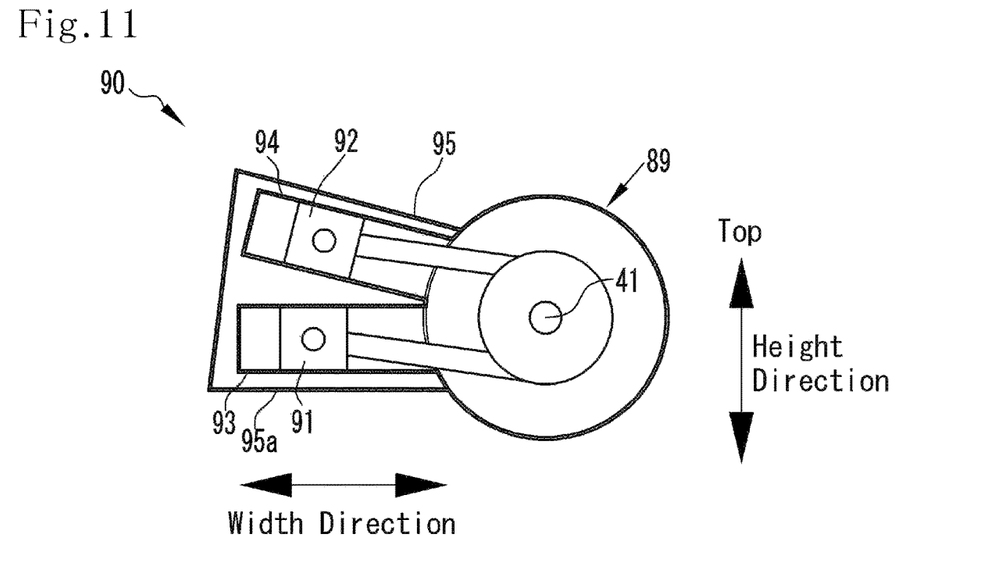
FIG. 11 is a back view showing the engine described in FIG. 10.

FIG. 11 shows the engine 89 described in FIG. 10. FIG. 11 shows schematically an inside of the block 95 of the engine 89. As shown in FIG. 11, the engine 89 is a narrow-angle V type engine in which a banking angle of the first cylinder 93 and the second cylinder 94 is configured as an angle smaller than 90 degrees, for example, when viewed from a rear side of a vehicle 90. In this engine 89, a direction that the first piston 91 makes reciprocating movement within the first cylinder 93 is disposed in the horizontal direction in a vehicle-mounted state. Moreover, a direction that the second piston 92 makes reciprocating movement within the second cylinder 94 is a direction of the first cylinder 93 rotated upwardly by an amount of the banking angle around the crank shaft 41. In other words, in the engine 89, a lower section 95a of the block 95 covering the first cylinder 93 and the second cylinder 94 is configured flat in the horizontal direction. This makes it possible for at least part of the motor 22, for example, substantially the upper section 22a of the motor 22 to be disposed overlapping below the lower section 95a of the block 95. Moreover, in order to reduce a size in the front-rear direction of the vehicle 90 of the engine 89, the first cylinder 93 and the second cylinder 94 are arranged such that part 94a of the second cylinder 94 overlaps part 93a of the first cylinder 93 when viewed from an upper surface of the vehicle 90 (refer to FIG. 10).

In each of the above-described embodiments, the engine 19 is of horizontal type and is mounted in a longitudinally-positioned posture. However, the present disclosure is not limited to this, and the engine may be a vertical type reciprocating engine where a direction that the piston 40 makes reciprocating movement within the cylinder is disposed in a vertical direction in a vehicle-mounted state. Moreover, the engine 19 may be arranged in a laterally-positioned posture where the crank shaft 41 is parallel to the vehicle width direction.

Figure 12:
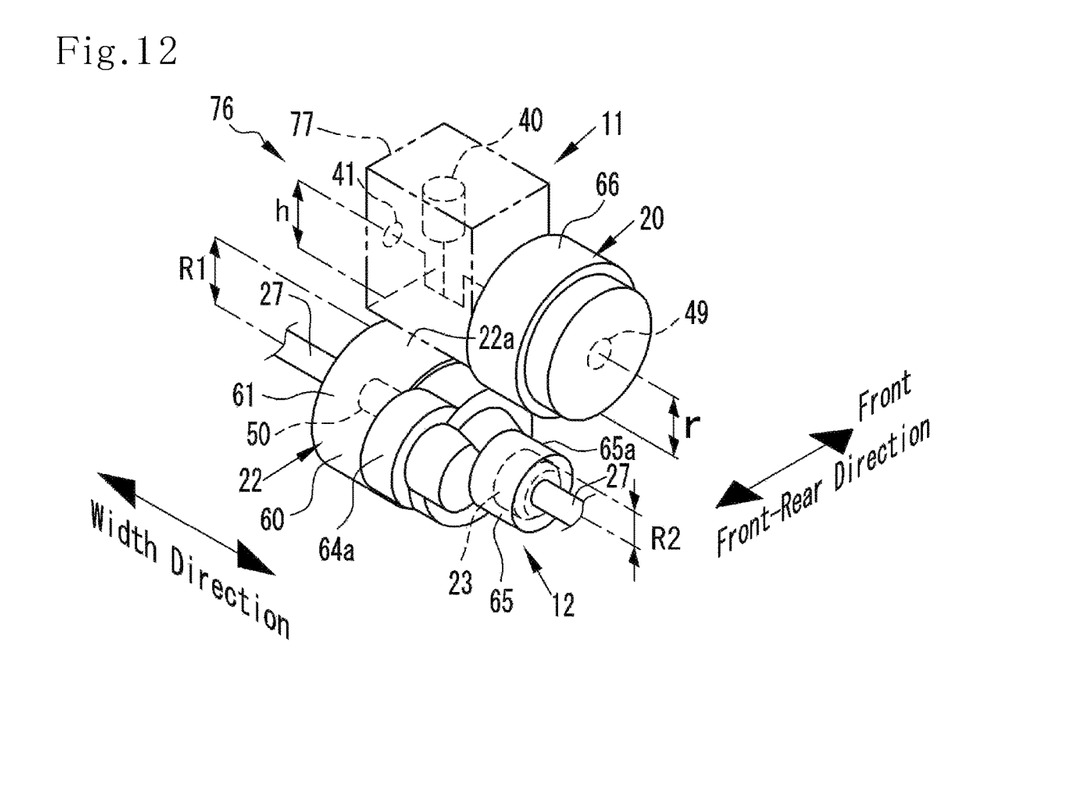
FIG. 12 is a perspective view showing a vehicle in an embodiment where a vertical type engine is installed laterally.
Figure 13:
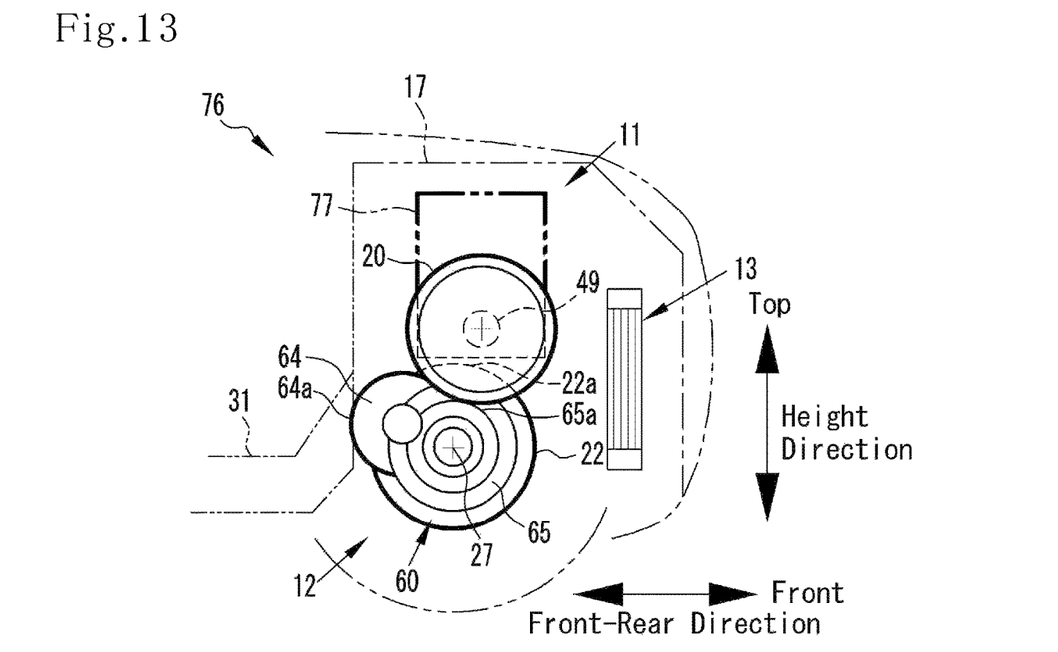
FIG. 13 is a side view showing the vehicle of FIG. 12.

FIG. 12 shows a vehicle 76 in an embodiment where a vertical type engine 77 is installed laterally. FIG. 13 is a side view showing the vehicle 76 of FIG. 12. As shown in FIGS. 12 and 13, the engine 77 is configured as a vertical type reciprocating engine, and is installed in the engine room 17 in a laterally-positioned posture where the crank shaft 41 is parallel to the vehicle width direction. The generator 20 is disposed with the rotary shaft 49 coaxial with the crank shaft 41, and is disposed close to the engine 77. The motor 22 is disposed such that the output shaft 50 is disposed coaxially with the axle 27 and, moreover, such that the output shaft 50 is in a direction parallel to or a direction close to parallel to the rotary shaft 49 of the generator 20. Moreover, at least part of the motor 22, for example, substantially the upper section 22a of the motor 22 is disposed so as to overlap below the engine 77. In other words, a length r in a radial direction from an outer diameter of the generating cover 66 to a shaft center of the rotary shaft 49 of the generator 20 is longer than a length h in the vehicle height direction from a lower section (excluding the exhaust system 44) of the engine 77 to a shaft center of the crank shaft 41. In addition, a length R1 in a radial direction from a shaft center of the axle 27 to an outer diameter of the first section 61 is longer than a length R2 in a radial direction from the shaft center of the axle 27 to an outer diameter of the third section 65. Therefore, the engine 77 can be placed in a low position within the engine room 17. In addition, at least part of the third section 65 covering the differential 23, for example, the upper section 65a of the third section 65 is disposed so as to overlap below the generator 20. Moreover, at least part of the projecting section 64 covering the speed reducer 24, for example, the rear section 64a of the projecting section 64 penetrates inside the center tunnel 31. Note that in FIGS. 12 and 13, members that are the same as or similar to members described in FIGS. 1 to 8 are assigned with the same symbols as those assigned in FIGS. 1 to 8, and detailed descriptions thereof are omitted here.

Figure 14:
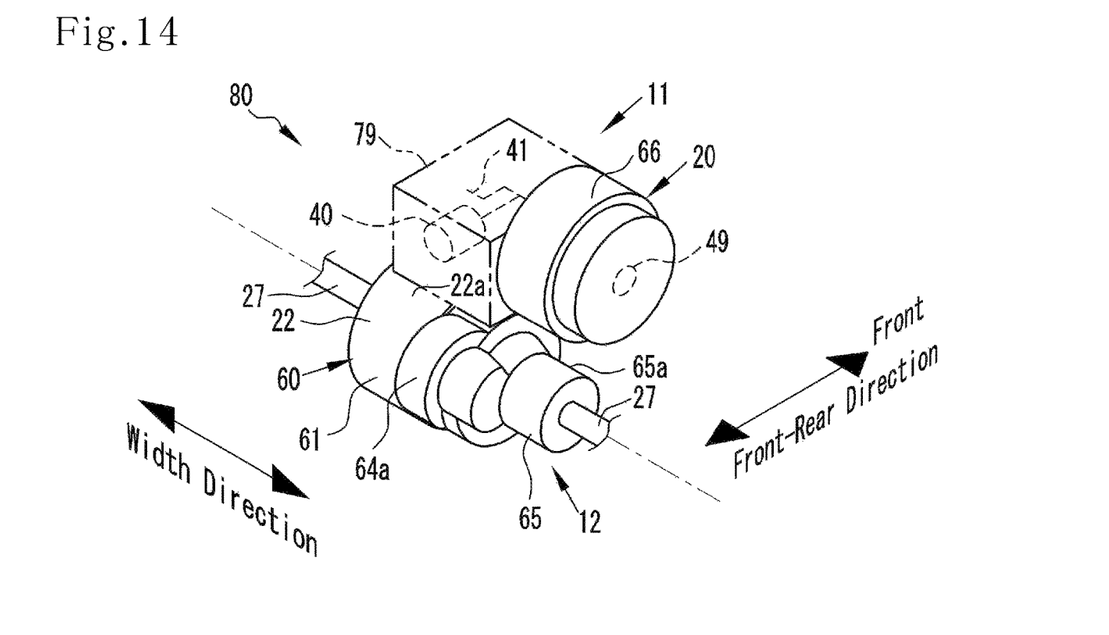
FIG. 14 is a perspective view showing a vehicle in an embodiment where a horizontal type engine is installed laterally.
Figure 15:
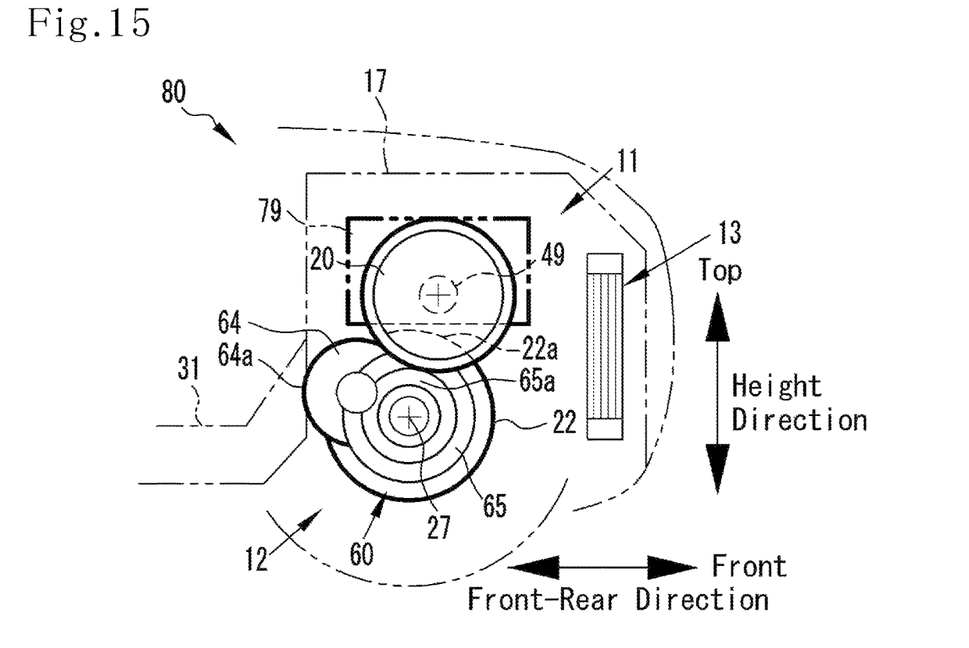
FIG. 15 is a side view showing the vehicle of FIG. 14.

FIG. 14 is a perspective view showing a vehicle 80 in an embodiment where a horizontal type engine 79 is installed laterally. FIG. 15 is a side view showing the vehicle 80 of FIG. 14. As shown in FIGS. 14 and 15, the engine 79 is configured as a horizontal type reciprocating engine, and is installed in the engine room 17 in a laterally-positioned posture. The generator 20 is disposed with the rotary shaft 49 coaxial with the crank shaft 41, and is disposed close to the engine 79. At least part of the motor 22, for example, substantially the upper section 22a of the motor 22 is disposed so as to overlap below the engine 79. In addition, at least part of the third section 65, for example, the upper section 65a of the third section 65 is disposed so as to overlap below the generator 20. Moreover, at least part of the projecting section 64, for example, the rear section 64a of the projecting section 64 penetrates inside the center tunnel 31. In the present embodiment, in the same way as or similarly to as described in FIG. 12, the length in the radial direction from the outer diameter of the generating cover 66 to the shaft center of the rotary shaft 49 of the generator 20 is longer than the length in the vehicle height direction from the lower section (excluding the exhaust system 44) of the engine 79 to the shaft center of the crank shaft 41. In addition, the length in the radial direction from the shaft center of the axle 27 to the outer diameter of the first section 61 is longer than the length in the radial direction from the shaft center of the axle 27 to the outer diameter of the third section 65. Therefore, the engine 79 can be placed in a low position within the engine room 17. Note that in FIGS. 14 and 15, members that are the same as or similar to members described in FIGS. 1 to 8 are assigned with the same symbols as those assigned in FIGS. 1 to 8, and detailed descriptions thereof are omitted here.

Figure 16:
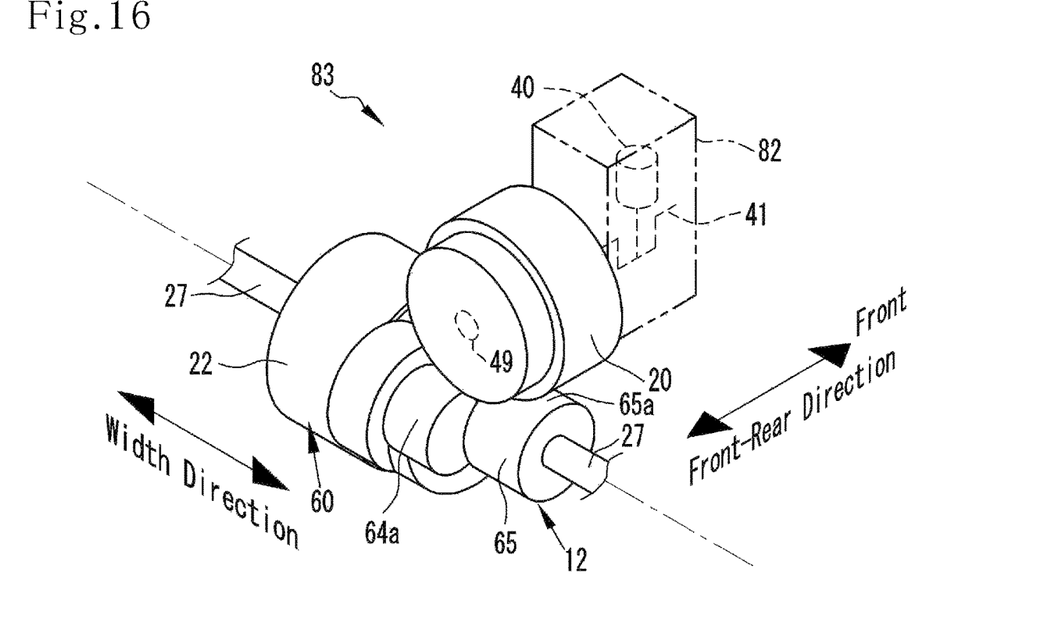
FIG. 16 is a perspective view showing a vehicle in an embodiment where a vertical type engine is installed longitudinally.
Figure 17:
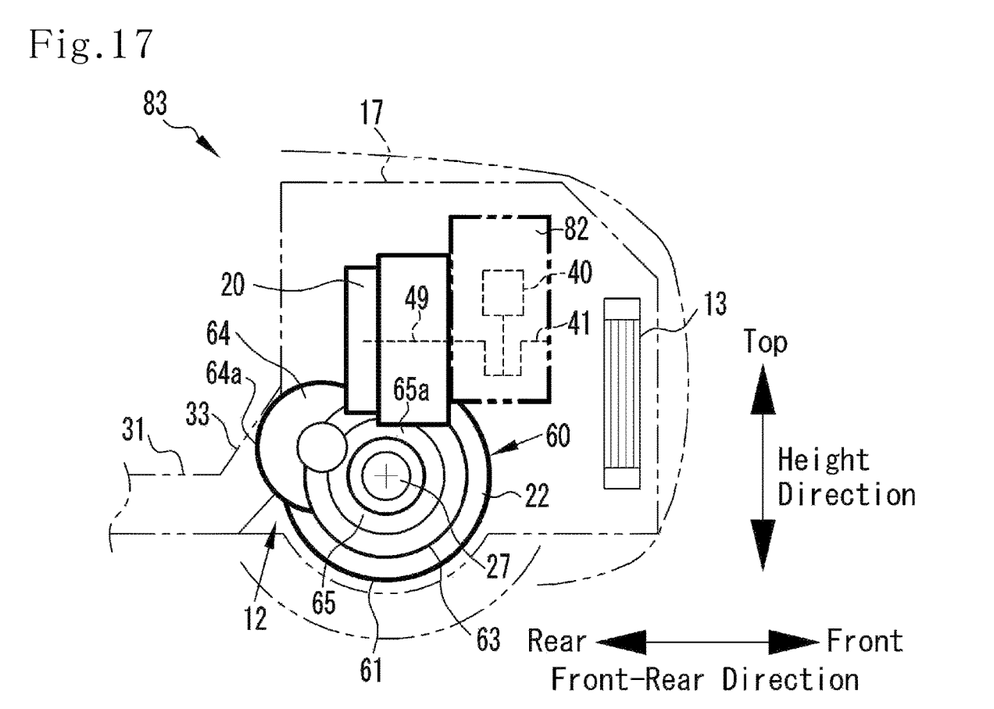
FIG. 17 is a side view showing the vehicle of FIG. 16.

FIG. 16 is a perspective view showing a vehicle 83 in an embodiment where a vertical type engine 82 is installed longitudinally. FIG. 17 is a side view showing the vehicle 83 of FIG. 16. As shown in FIGS. 16 and 17, the engine 82 is configured as a vertical type reciprocating engine, and is installed in the engine room 17 in a longitudinally-positioned posture where the crank shaft 41 is parallel to the front-rear direction of the vehicle 83. The generator 20 is disposed with the rotary shaft 49 coaxial with the crank shaft 41 and is disposed close to the engine 82 to the rear in the front-rear direction of the vehicle 10 of the engine 82. At least part of the third section 65 of the drive housing 60, for example, the upper section 65a of the third section 65 of the drive housing 60 is disposed so as to overlap below the generator 20. Moreover, at least part of the projecting section 64, for example, the rear section 64a of the projecting section 64 penetrates into the center tunnel 31. Note that in FIGS. 16 and 17, members that are the same as or similar to members described in FIGS. 1 to 8 are assigned with the same symbols as those assigned in FIGS. 1 to 8, and detailed descriptions thereof are omitted here.

The above-described embodiments are each exemplifications of the present disclosure, and structures and functions specific to a certain embodiment may be applied also to another embodiment. In addition, the present disclosure is not limited to the above-described embodiments, and changes may be appropriately made in a range not departing from the object of the present disclosure. For example, in each of the above-described embodiments, the output shaft 50 of the motor 22 is disposed parallel to the vehicle width direction, but the present disclosure is not limited to this, and an FR system where the output shaft 50 of the motor 22 is disposed orthogonally to the vehicle width direction may be adopted.

What is claimed is:

1. A vehicle comprising:
   an engine that burns a gaseous mixture in a cylinder to generate a torque;
   a generator that is rotated by the torque to generate electricity; and
   a motor that is driven by electric power generated by the generator or electric power generated by the generator accumulated in a battery to generate a drive torque for propelling the vehicle,
   wherein the generator has a rotary shaft to which the torque is transmitted,
   the rotary shaft is disposed parallel to a front-rear direction of the vehicle proximate to a rear side of the engine,
   the motor has an output shaft that outputs the drive torque to propel the vehicle and the output shaft extends parallel to a width direction of the vehicle,
   the vehicle further comprises a drive housing that covers the motor, and a generating cover that covers the generator,
   at least part of the drive housing is disposed so as to overlap below the generating cover,
   the vehicle further comprises an inverter that converts direct current electric power that is output from the battery into alternating current electric power for the motor,
   the engine whose shape is simplified so as to include an outline external shape is a rectangular parallelepiped in a posture disposed in a width direction of the vehicle and the generator whose shape is simplified so as to include an outline external shape is a cylinder in a posture disposed along a cylindrical axis in the front-rear direction of the vehicle, have a combined external outline which is L-shaped when viewed from an upper surface of the vehicle, and
   the inverter is disposed in a space of the L-shape made by the external outline of the engine and the generator.

2. The vehicle according to claim 1,
   wherein the engine includes a crank shaft that outputs the torque, and that is disposed parallel to the front-rear direction of the vehicle coaxially with the rotary shaft of the generator,
   the vehicle further comprises: an axle that transmits the drive torque to drive wheels to propel the vehicle and that is disposed coaxially with the output shaft; and a differential that transmits the drive torque to the axle to propel the vehicle,
   the drive housing includes a first case covering the motor, and a second case disposed adjacent to the first case in the width direction of the vehicle to cover the differential, the second case has an outer diameter around the axle which is smaller than that of first case, and the second case is disposed such that at least part of the second case overlaps below the generating cover, and a lower portion of the generating cover overlaps the first case when viewed from a side of the vehicle.

3. The vehicle according to claim 2, wherein the engine includes a horizontal engine including a cylinder bore that is formed in the cylinder, and a piston that makes reciprocating movement within the cylinder bore, the engine is mounted on the vehicle in such a manner that a reciprocating direction of the piston within the cylinder bore intersects a vertical line at a predetermined angle, and the motor is disposed on a top dead center side of the piston with respect to the differential.

4. The vehicle according to claim 3, wherein an intake system is provided above the engine, and an exhaust system is provided below the engine.

5. The vehicle according to claim 2, further comprising:

a cabin provided in the vehicle;

a center tunnel disposed extending in the front-rear direction of the vehicle within the cabin;

a speed reducer that transmits to the differential the drive torque to propel the vehicle transmitted from the output shaft; and a third case covering the speed reducer while protruding toward a rear side of the vehicle between the first case and the second case, and a third case penetrates inside the center tunnel at least partially.

6. The vehicle according to claim 1, further comprising:

a charger that charges the battery by receiving electric power from an external power source, wherein the charger is disposed above the engine.

7. A vehicle comprising:

an engine that burns a gaseous mixture in a cylinder to generate a torque;

a generator that is rotated by the torque to generate electricity; and a motor that is driven by electric power generated by the generator or electric power generated by the generator accumulated in a battery to generate a drive torque for propelling the vehicle, wherein the engine includes a piston that makes reciprocating movement within a cylinder bore formed in the cylinder, and a crank shaft that outputs the torque in response to the reciprocating movement of the piston, the generator has a rotary shaft to which the torque is transmitted, the rotary shaft is disposed coaxially with the crankshaft, the motor has an output shaft that outputs the drive torque to propel the vehicle, the vehicle further comprises:

a differential having an axle that transmits the drive torque to drive wheels to propel the vehicle and that is disposed coaxially with the output shaft;

a generating cover that covers the generator;

a first case that covers the motor;

a second case that is disposed adjacent to the first case in a width direction of the vehicle to cover the differential; and an inverter that converts direct current electric power output from the battery into alternating current electric power for the motor, wherein the second case has an outer diameter around the axle which is smaller than that of first case, the second case is disposed such that at least part of the second case overlaps below the generating cover, the motor is disposed on a top dead center side of the piston with respect to the differential, the engine whose shape is simplified so as to include an outline external shape is a rectangular parallelepiped in a posture disposed in a width direction of the vehicle and the generator whose shape is simplified so as to include an outline external shape is a cylinder in a posture disposed along a cylindrical axis in a front-rear direction of the vehicle, have a combined external outline which is L-shaped when viewed from an upper surface of the vehicle, and the inverter is disposed in a space of the L-shape made by the external outline of the engine and the generator.

8. The vehicle according to claim 7, wherein the engine is disposed in front of the generator in the front-rear direction of the vehicle.

* * * * *